United States Patent [19]

Brown et al.

[11] Patent Number: 5,537,474
[45] Date of Patent: Jul. 16, 1996

[54] METHOD AND APPARATUS FOR AUTHENTICATION IN A COMMUNICATION SYSTEM

[75] Inventors: Daniel P. Brown, Elmhurst; Louis D. Finkelstein, Wheeling, both of Ill.

[73] Assignee: Motorola, Inc., Schaumburg, Ill.

[21] Appl. No.: 282,832

[22] Filed: Jul. 29, 1994

[51] Int. Cl.$^6$ .............................. H04L 9/32; H04M 11/00
[52] U.S. Cl. ................................................ 380/23; 379/62
[58] Field of Search .............................. 380/23, 30, 49; 379/62

[56] References Cited

U.S. PATENT DOCUMENTS

| | | | |
|---|---|---|---|
| 4,399,330 | 8/1983 | Kuenzel . | |
| 5,204,902 | 4/1993 | Reeds, III et al. . | |
| 5,233,656 | 8/1993 | Langrand et al. | 380/23 |
| 5,237,612 | 8/1993 | Raith . | |
| 5,239,294 | 8/1993 | Flanders et al. | 379/62 X |
| 5,249,230 | 9/1993 | Mihm, Jr. . | |
| 5,377,267 | 12/1994 | Suzuki et al. | 380/23 |
| 5,392,356 | 2/1995 | Konno et al. . | |
| 5,396,543 | 3/1995 | Beeson et al. . | |
| 5,420,908 | 5/1995 | Hodges et al. . | |
| 5,438,608 | 8/1995 | Kojima . | |

OTHER PUBLICATIONS

Michael Mouly and Marie–Bernadette Pautet, "The GSM System for Mobile Communications", 1992, pp. 67–71.

*Primary Examiner*—Gilberto Barrón, Jr.
*Attorney, Agent, or Firm*—Jeffrey G. Toler

[57] ABSTRACT

A method and apparatus for authenticating a roaming subscriber. In a preferred embodiment, a subscriber receives a challenge that is in a format of a local authentication protocol, and determines whether the local authentication protocol is the subscriber's home system authentication protocol. If it is not, the subscriber converts the challenge into a format (e.g., bit length) compatible with its home system authentication protocol, and processes the converted challenge with the subscriber's secret key and authentication algorithm into an authentication response. The authentication response is converted to be compatible with the local authentication protocol, and transmitted to a local system communication unit. The challenge and response is then forwarded to the subscriber's home system for similar conversion and processing, and subscriber's response is compared against a home system generated response.

61 Claims, 9 Drawing Sheets

METHOD AND APPARATUS FOR AUTHENTICATION IN A COMMUNICATION SYSTEM

FIELD OF THE INVENTION

The present invention relates to communication systems and, more particularly, to authentication and encryption within communication systems.

BACKGROUND OF THE INVENTION

Many communication systems currently use authentication and encryption to enhance security of the systems. These communication systems include cellular radiotelephone communication systems, personal communication systems, paging systems, as well as wireline and wireless data networks. A cellular communication system will be described below by way of example; however, it will be appreciated by those skilled in the art that authentication and encryption techniques described can be readily extended to other communication systems.

Turning to the cellular communication systems, these systems typically include subscriber units (such as mobile or portable units) which communicate with a fixed network communication unit via radio frequency (RF) communication links. A typical cellular communication system includes at least one base station and a switching center. The switching center that a subscriber unit accesses may not be his "home" switching center. In this case, the subscriber unit is termed a roaming subscriber unit. The switching center which the subscriber unit accesses (termed the "visited" switching center) must communicate with his "home" switching center via the public switched telephone network (PSTN) or other type of connection, such as a satellite link, to retrieve information about the subscriber unit and provide service billing information back to the "home" switching center.

One responsibility of the fixed network communication unit (such as a switching center, location register or authentication center) is to grant use of the communication system to the subscriber unit after the requesting subscriber unit meets the authentication requirements of the system. In a typical cellular telephone communication system, each subscriber unit is assigned a mobile subscriber identifier (MSI), which uniquely identifies the subscriber unit from other subscriber units. In the European cellular communication system, GSM (Global System for Mobile Communications), one such identifier is the international mobile subscriber identification number (IMSI). In order to protect the privacy of the IMSI, GSM calls for most subscriber-fixed network communications to use a temporary mobile subscriber identifier (TMSI) in lieu of the IMSI. In the U.S., EIA-553 § 2.3 specifies that each subscriber shall have a mobile identification number (MIN) and a factory set electronic serial number (ESN). For convenience all such and similar identifiers will be referred to by the term MSI below.

Detection of a legitimate subscriber's MSI may be accomplished by RF eavesdropping or by purposeful or inadvertent divulgence of the MSI by the radiotelephone installer. Although the IMSI is more protected than the MIN/ESN combination from inadvertent divulgence, the IMSI remains similarly vulnerable to acquisition during RF eavesdropping. Under either protocol, once the subscriber's MSI is known (stolen), a thief may reprogram another subscriber unit with the stolen MSI causing two or more subscriber units to have the same MSI. While cellular radiotelephone systems have authentication procedures to deny access to subscribers not having legitimate MSIs, most typically lack effective capability for detecting multiple users or to minimize the effect of installer leaked MSIs. As a consequence, legitimate users may be billed for both a thief's use of his MSI as well as their own usage.

Because of this problem with illegitimate subscribers (clones) and other forms of fraudulent access, several authentication protocols have been devised. In GSM the fixed network communication unit initiates the authentication process following receipt of a TMSI from the subscriber by generating and sending a challenge (a random or pseudo-random number or RAND) to the subscriber. The subscriber is required to retrieve at least two enciphering elements from its memory: a predetermined ciphering algorithm (e.g., A38) and the subscriber's authentication secret key (Ki). The subscriber then mixes (enciphers) the RAND and Ki into a signed response (SRES) and transmits this signed response back to the fixed network communication unit. If the received SRES matches with the network generated SRES (using the same algorithm and the subscriber's Ki stored in the network), the subscriber is authenticated for service.

In the USA, the United States Digital Cellular (USDC) and CDMA (Code Division Multiple Access) standards are known as IS-54 and IS-95, with an interworking protocol known as IS-41 (all published by the Electronic Industries Association (EIA), 2001 Eye Street, NW, Washington, DC 20006). These use the same basic authentication protocol utilizing a series of specialized messages which must be passed between the subscriber and a communication unit of the network before system access is granted. However, the IS-54/95 protocols employ a "global challenge" of 32 bits in length, as compared with the 128 bit RAND used in GSM. When this challenge is mixed (or encrypted) together with a shared secret key (the $SSD_A$), the result is an 18 bit signed response (AUTH_R) (contrasting with the 32 bit SRES in GSM). Further processing, using the same algorithm and additional shared secret data ($SSD_B$) or using a different algorithm, is used to generate the message encryption algorithm key and voice privacy mask.

A fundamental problem with having these significantly different authentication protocols is that there is no effective way to provide for "seamless" roaming for subscribers across air interface boundaries. This means that to provide for dual air interface phones, under known methods the subscriber would be required to additionally maintain dual identifiers (and dual accounts) and secret keys for each of the protocols used in the two systems. Even where the subscriber possessed a smart card or detachable subscriber identity module (SIM) capable of use in handsets of different systems, the user would still be required to maintain dual identifiers and have the equivalent of two SIMs and dual registrations for each smart card.

The concept of universal personal mobility has emerged as an important feature of advanced communications networks. However, such universal personal mobility will only be achieved when a user can be readily authenticated even in visited systems employing authentication protocols differing from those of his home system. Therefore, a need exists for a privacy and authentication technique which can alleviate these problems and allow for user roaming across system boundaries.

DETAILED DESCRIPTION

Figure 8:
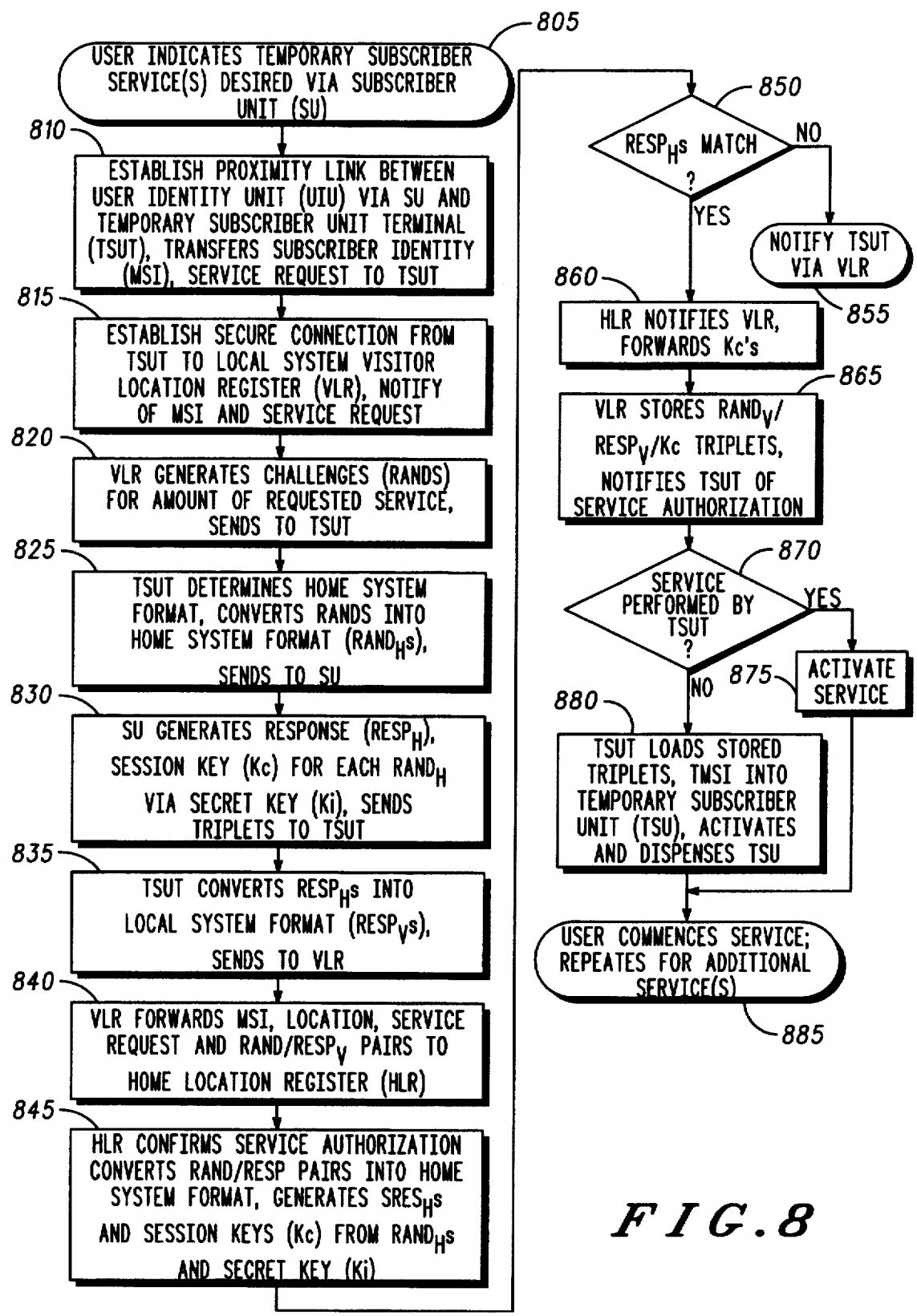
FIGS. 8 and 9 are flowcharts of an authentication process in accordance with a fourth embodiment of the invention.
Figure 9:
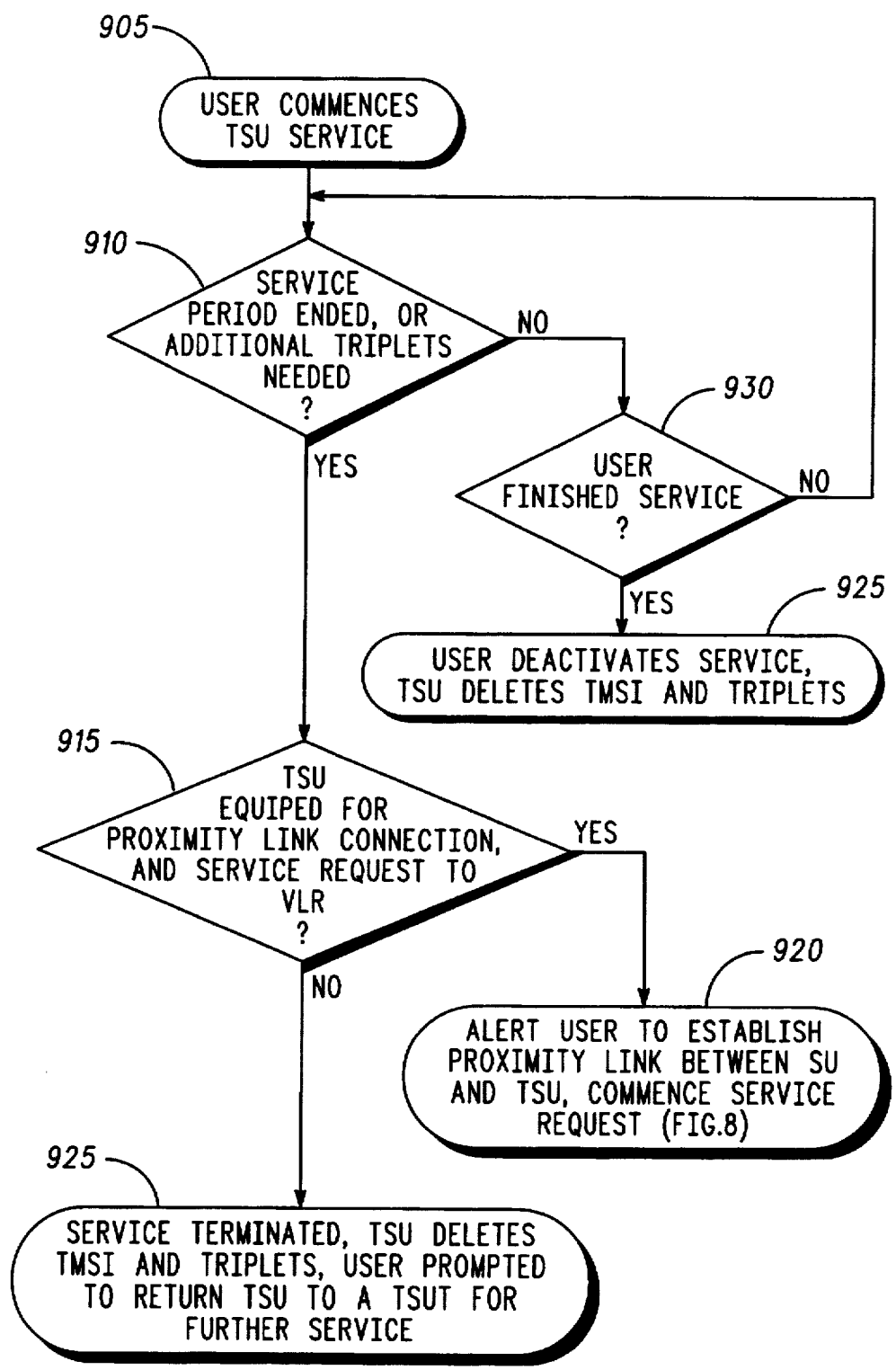

These needs for providing authenticated roaming across system boundaries are met through provision of a method and apparatus for authentication of the subscriber with his own system even when located in a visited system. This authentication is accomplished, in an illustrative embodiment of the invention, by first providing the subscriber with a subscriber identification unit (SIU) containing a subscriber identifier (MSI) and secret key (e.g., an A-key, Ki or the like). A processor is also provided, either in the subscriber unit or (in the case of embodiments such as described in connection with FIGS. 8 and 9 below) in fixed units, providing a necessary conversion between the home system authentication formats and the visited system authentication formats. An interworking function is also provided connecting the various systems, typically connected as an adjunct or part of a location register or switching center.

Figure 1:
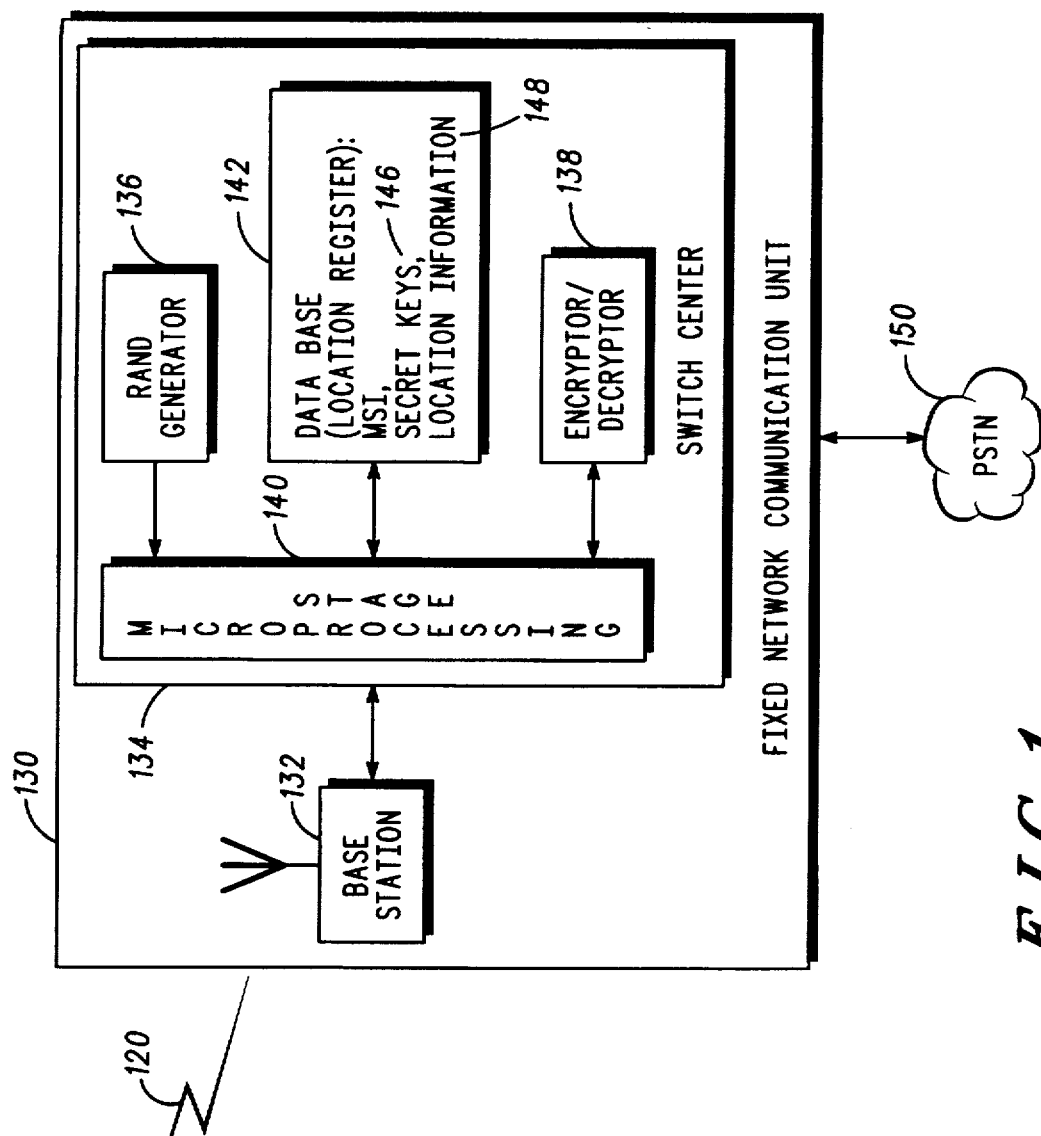
FIG. 1 is a block diagram showing a first embodiment of a communication system having a subscriber unit in a fixed network communication unit in accordance with the present invention.

FIG. 1 generally depicts a subscriber communication unit 110 such as a cellular subscriber telephone and a fixed network communication unit 130, such as a cellular telephone base site and switching center. The subscriber unit 110 is generally depicted showing its RF stage 112 for receiving and transmitting RF signals, a microprocessing stage 114 connected to the RF stage and also connected to a memory 115. In addition the subscriber unit 110 is illustrated with an embedded subscriber identification unit (SIU) 116 generally illustrated including a microprocessing unit 118 and a memory 119. The SIU may be a detachable module such as the subscriber identity module (SIM) found in GSM phones. In accordance with the GSM protocol, such an SIU would have embedded within it both the subscriber identifier (IMSI) and secret key (Ki), as well as appropriate authentication and key agreement algorithms (A3 and A8; A5 resides in subscriber unit 110) to perform the security functions desired for the subscriber unit. In this respect the SIM is a smart card. It should be understood that while the subscriber unit 110 is illustrated having the SIU 116 embedded therein, various embodiments of the invention described below will show use of an SIU, such as a smart card, in arrangements where it cannot be permanently integrated within a subscriber unit. Further, it is possible for the functions of the SIU to be carried out within an appropriately structured subscriber unit using the memory 115 and processor 114 of the subscriber unit 110, as long as the unit is appropriately equipped with additional circuitry for communicating the security information, such as is discussed further in connection with FIG. 6 below. One skilled in the art will thus recognize that while there are a variety of ways by which the user's security information (e.g. identifier and secret key) can be maintained and accessed for authentication and privacy functions, the descriptions here and of the SIU only represent the presently preferred embodiment in connection with the cellular radiotelephone system. Additional elements which may be accessed by the microprocessing stage 114 of the subscriber unit 110 may include data input stages such as key entry pads or voice microphones, optional feature items, and in USDC a random number generator (for generating random challenges from the subscriber unit) and appropriate encryption/decryption circuitry.

In the current USDC phones not making provision for a smart card/SIU, the subscriber identifier (MSI, which may include the mobile identification number (MIN) and electronic serial number (ESN)) will reside in a nonvolatile memory. A 64 bit secret key called the "A-key" also resides in this memory. This A-key is also maintained in the home location register (HLR) for the subscriber in its home system. In order to minimize the need for inter network traffic while also maintaining the A-key as a secret key between the subscriber and the HLR alone, IS-54/95 provide for a temporary shared secret data key (SSD) for use in authentication and encryption. This SSD key is generated based on the input of a 56 bit challenge received along with a "change SSD" command and the A-key. Although the A-key is not shared, upon computation of the SSD the home system HLR will generally share the SSD with other requesting location registers (known as "visitors location registers" (VLRs)).

The next time an authentication event occurs, such as a registration attempt of the mobile subscriber unit within a service region, the serving system issues a 32 bit random challenge (RAND) on the global overhead channel. This RAND is input together with the SSD in a common algorithm used throughout the system to generate an 18 bit authentication response (AUTH_R). If the subscriber is in a visited system, the AUTH_R calculated in the subscriber is communicated via the fixed network communication unit 130 of the visited system to the home system HLR, together with the RAND. The HLR then performs its own calculation of AUTH_R using the RAND and the known SSD for the subscriber. If the AUTH_R provided by the subscriber is correct, the home system generally, and in a preferred embodiment, provides the SSD to the visited system, along with other user data, in order that the visited system can perform future authentications without the need for further interactions with the home network. Autonomous authentication by the visited network is then possible through the use of this shared SSD and the common authentication algorithm. In addition to the initial calling request, authentication may occur, e.g., upon the invocation of special calling services, upon the occurrence of a predetermined period of traffic communication, or upon events such as a request for a subscriber terminated call. In addition to providing for further authentication, the SSD is also used in determining an appropriate message encryption algorithm key and voice privacy mask.

Returning to FIG. 1, a fixed network communication unit 130 is generally depicted including a switch center (MSC) 134 having a processor stage 140, a database or location register 142, a RAND generator 136 and encrypter/decrypter 138. Where the location register 142 is a VLR, the secret key 146 stored there would be the SSD, along with any generated crypto key or voice privacy mask. In order to maintain the privacy of the A-key, this secret key 146 is only stored in the home location register (HLR) of the subscriber, along with MSI 144 and location information 148 regarding the subscriber's last registered location. The RAND generator 136 is used in generating the challenges, which are typically generated at the switch center 134 connected with the serving base station 132 in communication with the subscriber unit 110. The fixed network communication unit 130 is in turn connected with a public switch telephone network (PSTN) 150. The PSTN link can be used for connecting circuit switched calls to fixed end systems, as well as to link VLRs to HLRs as may be required for authentication and billing of roaming subscribers.

Figure 2:
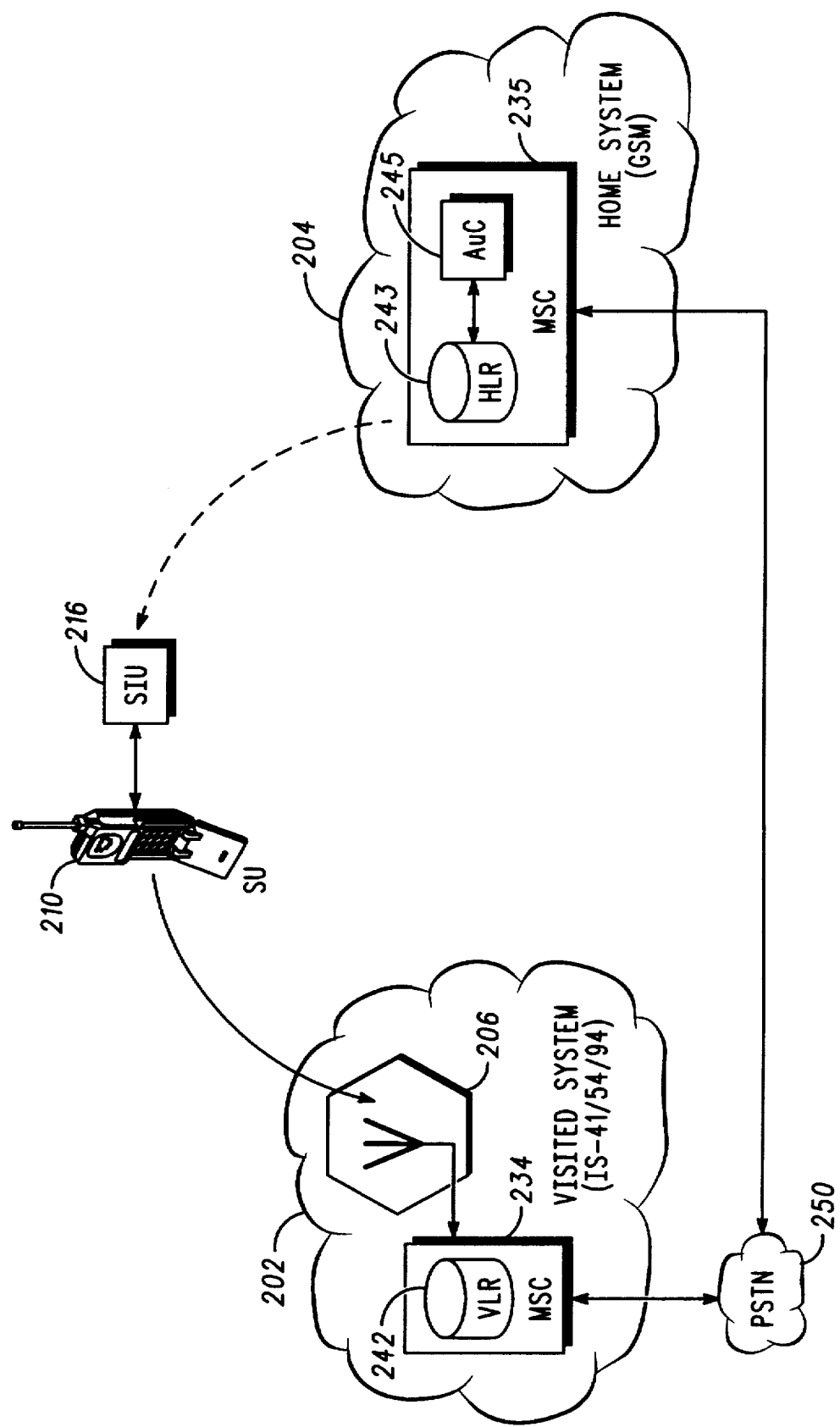
FIG. 2 is a diagram depicting a subscriber roaming between systems in accordance with the present invention.
Figure 3:
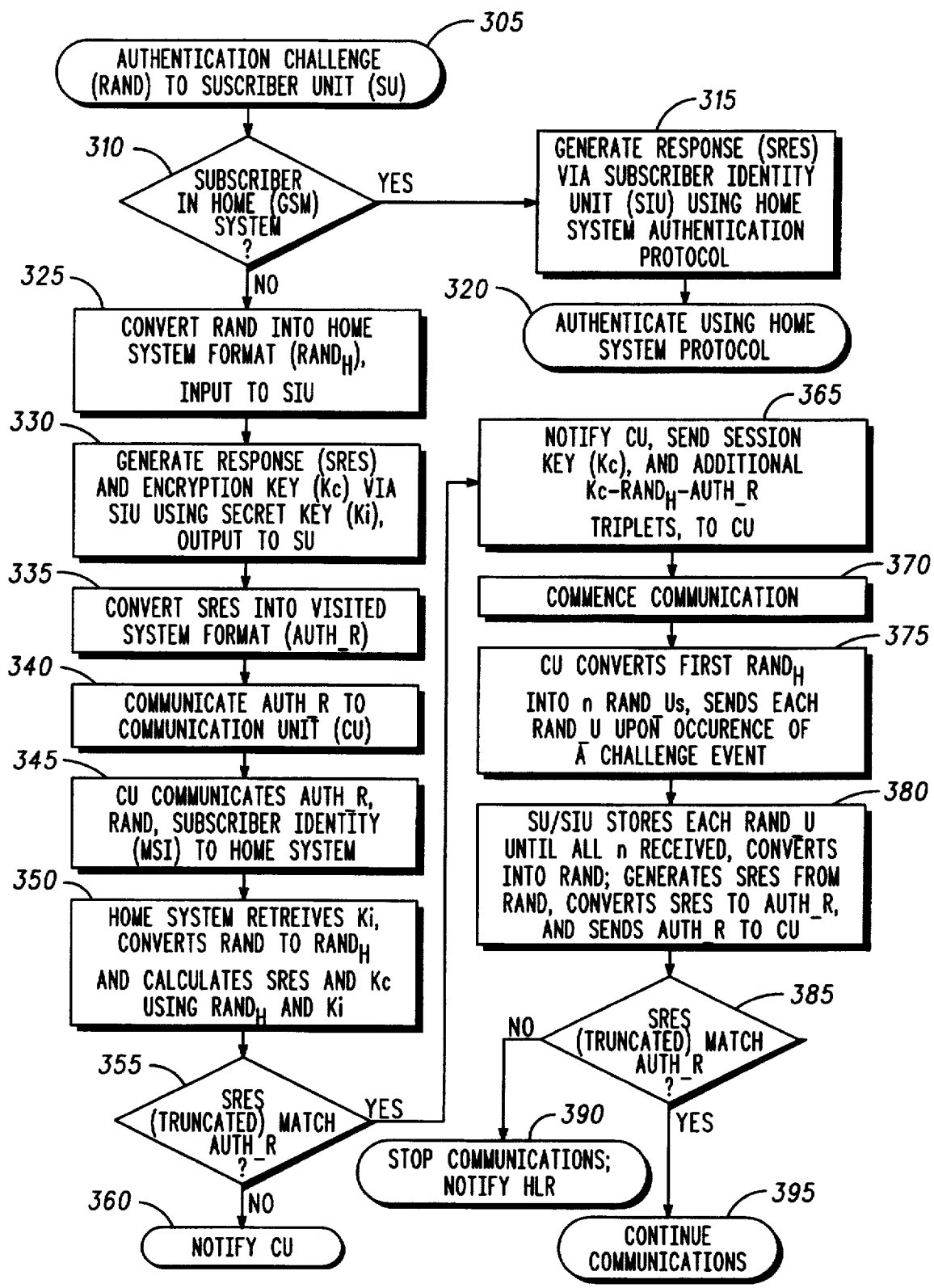
FIG. 3 is a flowchart of an authentication process used in accordance with a first embodiment of the invention.

While the above described IS-54/95 approach towards authentication allows for limited roaming within a system using a USDC protocol, there is at present no process by which a subscriber roaming out of his home system can still be authenticated in a system using a different authentication protocol. Turning now to FIGS. 2 and 3, a solution to this problem is illustrated in a first embodiment of the invention. In FIG. 2, a dual air interface subscriber unit (SU) 210 is shown roaming out of its home system, a GSM system, into a visited system, one complying with USDC or CDMA standards (IS-54/95). This subscriber is also carrying a subscriber identification unit (SIU) 216 for use in the subscriber unit 210, similar to those illustrated in subscriber unit 110 and SIU 116 of FIG. 1. In accordance with GSM standards, SIU 216 would typically be a SIM or smart card attachable to subscriber unit 210. Because subscriber unit 210 is a dual air interface phone, its RF stages and microprocessor stages are equipped to operate in systems using different air interfaces. By virtue of the present invention, subscriber unit 210 is also able to be authenticated in the different systems. In the particular embodiment of FIG. 3, the subscriber unit 210 is equipped to carry out the necessary conversions for authentication. Thus, the SIU 216 may simply be a standard GSM SIM card, requiring no further processing than would be expected within a standard GSM system.

As alluded to before, the GSM authentication protocol differs significantly from that of a typical USDC authentication protocol described above. In GSM each SIU, or SIM, is programmed with the subscriber's unique "international mobile subscriber identity" (IMSI) and a 128 bit secret key, Ki. This IMSI and Ki are also retained in the HLR of the home system. In a typical GSM switching center 235, the actual storage location for the IMSI and Ki is an authentication center (AuC) 245 (a processor and database) connected to the HLR 243. When in its home system, and if subscriber unit 210 is in a service region served by its home location register, upon registration the HLR/AuC 243, 245 will generate a 128 bit challenge (RAND) and communicate this to the subscriber unit. At the same time, the HLR/AuC 243, 245 will calculate a 32 bit signed response (SRES) using the RAND and secret key Ki in a mixing algorithm (A3). A session key, or secret encryption key (Kc) is also calculated using a separate algorithm (A8). At the same time the SIU 216 in subscriber unit 210 calculates SRES and Kc using the received RAND and stored Ki. SRES is then transmitted back from the subscriber unit 210 and forwarded to HLR/AuC 243, 245 for comparison with its internally calculated SRES. If there is a match, Kc is stored as an encryption variable and service is allowed to proceed. When roaming within the home system, the fixed network protocol is varied to allow for the fact that Ki is not shared with VLRs. Thus, upon registration of the subscriber unit 210, a request will be sent to the HLR for an appropriate number of triplet sets, each set consisting of a RAND, SRES, and Kc. Upon receipt, the VLR will then issue the challenge RAND, compare the response SRES, and if there is a match begin service using Kc as an encryption key.

The present invention allows for authentication across boundaries for systems like GSM and IS-54/95, while still leaving unchanged the air interfaces and authentication protocols used when a subscriber unit is operating within its home system. This is accomplished within the embodiments of FIGS. 2 and 3, by beginning with the issuance of a RAND at the serving communication unit 234 of the visited system 202. This is in keeping with the usage within a USDC type system, where a global challenge (RAND) is already being communicated to subscriber units entering a given cell coverage area 206 (step 305).

Upon recognition that this subscriber unit is in a visited system (step 310) (recognized, for example, by predetermined selection by the user, or processing of information from the visited system such as its overhead message train or authentication signaling peculiar to the visited system protocol) subscriber unit 210 will convert the received RAND into the home system format ($RAND_H$). This conversion may be done, for example, in the microprocessor unit 114 of FIG. 1. Coming from a GSM system into a IS-54/95 type system, such a conversion could be done by concatenating the 32 bit RAND received by the subscriber unit with an alternating high and low bit pattern ("one zero one zero" or "zero one zero one") depending on the parity of the 32 bit challenge, and into a 128 bit RAND expected by the SIU/SIM 216.

Being a typical GSM SIM, SIU 216 in turn calculates a 32 bit SRES and 64 bit Kc. The subscriber unit 210 then reformats the SRES, for example by truncating the 32 bit SRES into an 18 bit AUTH_R and communicating the AUTH_R to the serving switch center communication unit 234. (Steps 325–340).

In the preferred embodiment the switch center 234 next communicates the received AUTH_R, the 32 bit RAND, and subscriber identity (MSI) to the home system 204 via PSTN 250. It is thus assumed that no extra computational requirements are added to the visited system, since the necessary reconversion will be done by the home system at its service center 235. One skilled in the art will readily appreciate, however, that the necessary protocol conversions could be performed either in the visited system 202 service center 234, or in the home system 204 service center 235. A skilled artisan will also understand how to implement a necessary interworking function, in light of the invention, at either or both of the switching centers 234, 235 such that the signaling information communicated via PSTN 250 can be received and understood at the receiving switching center. Thus, the visited system 202 could implement the necessary conversion/interworking functions such that, should the home system 204 not respond to ordinary signaling and an unconverted AUTH_R/RAND pair, the visited system could do the necessary conversion and forward appropriately formatted information to the switch center 235 in home system 204.

On receipt of the AUTH_R/RAND pair and subscriber identity (MSI), HLR/AuC 243, 245 of home system 204 converts the 32 bit RAND into 128 bit $RAND_H$ using the same conversion protocol as applied by SIU 216. SRES and Kc are then calculated using the retrieved Ki and $RAND_H$, and a converted SRES (truncated in this example) is compared with the received AUTH_R. The visited system 202 switch center 234 is then notified whether subscriber unit 210 has been authenticated. If subscriber unit 210 has been authenticated, a Kc is forwarded as a secret session key for encryption purposes. (Steps 345–365).

In order to minimize inter system signaling, it is preferable to generate and send an additional set of challenge response triplets to VLR 242 for use in subsequent authentication. In this case, HLR/AuC 243, 245 will also generate additional sets (typically five) of Kc-$RAND_H$-SRES triplets in keeping with the above embodiment, HLR 243 will further process the $RAND_H$-SRES output into the visited system formatted RAND-AUTH_R pairs.

An alternative approach which would additionally utilize historical information in the authentication process would be that of converting the $RAND_H$ into n RANDs, where n is a number such as six. In other words, the 128 bit $RAND_H$ could be segmented into six 24 bit RAND_U's used for authentication of ongoing communications within a IS-54/95-type system. Once converted, the triplets would be forwarded to VLR 242 along with the initial session encryption key (Kc), and communications by subscriber unit 210 would then commence within the visited system 202. The visited system 202 would then communicate a RAND_U upon the occurrence of a challenge event, and subscriber unit 210 would store each of the RAND_Us until all n had been received. The subscriber unit would throw away any bits in excess of 128 from the combined n RAND_U's, and input the $RAND_H$ into the SIU 216. SIU 216 would in turn generate a SRES from the $RAND_H$, and output the SRES for conversion to an AUTH_R for transmission to the visited system 202. In a more flexible approach, the subscriber unit 210 could instead store the RAND_Us in a first-in-first-out register, using a predetermined fill pattern or the like when the register is not yet full to convert the stored bits into a 128 bit RAND, and otherwise using the last-in 128 bits as a RAND having historic information; the HLR would have already calculated an expected SRES taking into account this challenge approach. In either approach, upon appropriate authentication, communications would continue using the new Kc for the encryption variable. (Steps 365–395).

Figure 4:
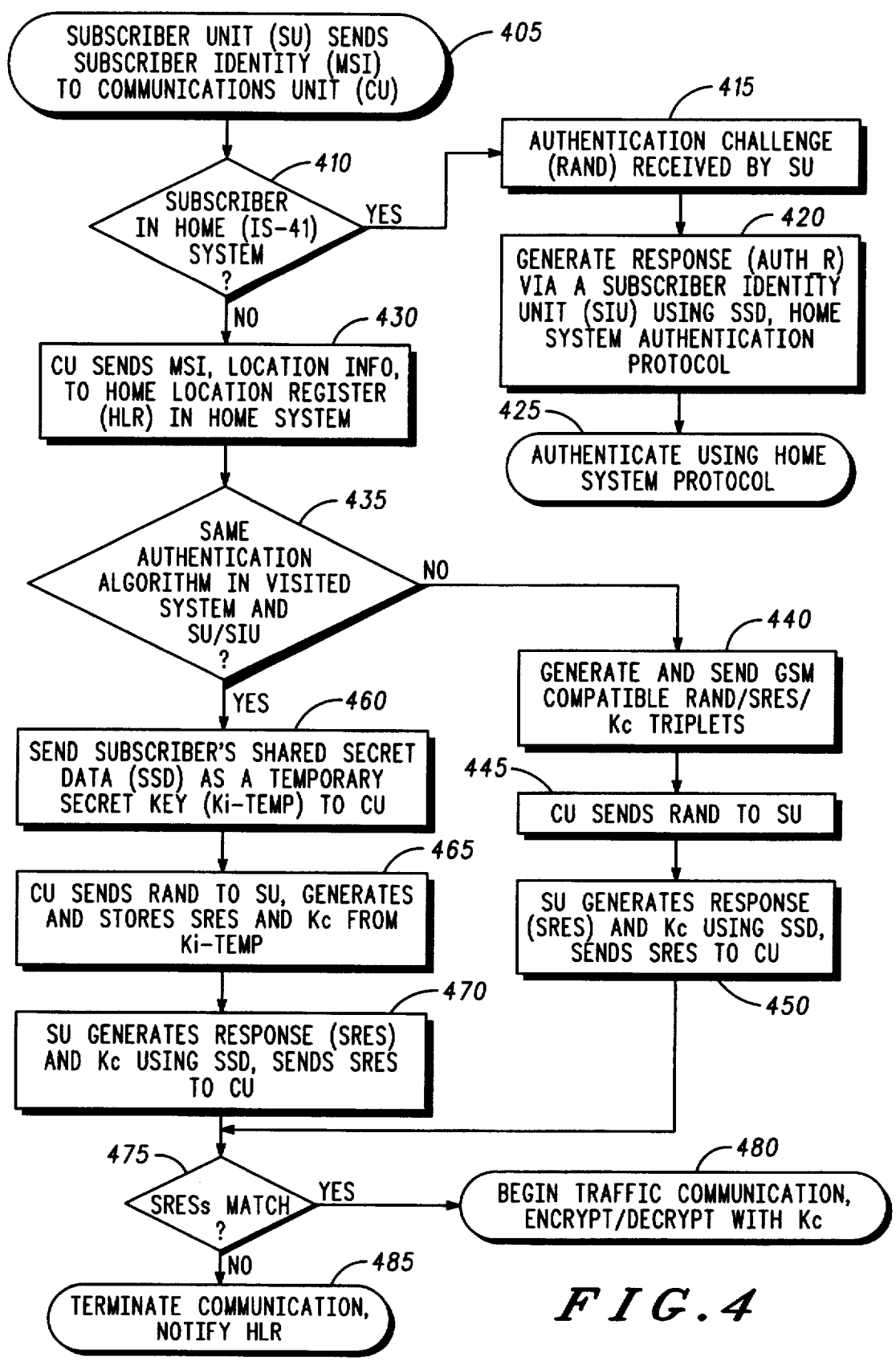
FIG. 4 is a flowchart of an authentication process used in accordance with a second embodiment of the invention.

FIG. 4 next illustrates an alternative embodiment of the invention, with a particular view towards roaming subscribers using dual air interface phones, but for which their home system uses an IS-41/54/95 authentication protocol. As with the embodiment of FIG. 3, should the subscriber unit 210 recognize that it is in its home system, authentication would proceed in accordance with the home system authentication protocol (Steps 315–320; 410–425). If the subscriber unit 210 on the other hand recognized that it was in a GSM system, it would commence by sending the subscriber identifier (MSI) to the serving base station using the appropriate air interface protocols. The fixed network communication unit, for example switch center 235, would then establish a connection via PSTN 250 to the home location register in the home system (which for purposes of discussion in FIG. 4 is considered within switch center 242). In a preferred embodiment, the subscriber profile maintained in the HLR would also note whether subscriber unit 210 or SIU 216 maintained a copy of the algorithm used in the visited system (e.g., the A38) or a special purpose algorithm or extension on the home system algorithm (e.g., for processing non-standard bit-length challenges or responses, without requiring storage of the visited system algorithm. If the same algorithm is used, the home system would then forward the shared secret data (SSD) of 128 bits to the visited system for use as a temporary secret key (Ki-temp). The visited system would generate the necessary RAND-SRES-Kc triplets from the Ki-temp and communicate the first RAND to the subscriber unit 210 for appropriate response. In response the subscriber unit would generate a SRES and Kc using its stored SSD and the A38 algorithm, and send the SRES to the visited system. (Steps 435–470).

Should the subscriber unit/SIU 216 not be equipped with appropriate visited system authentication algorithms, the home system would generate and send GSM compatible RAND-SRES-Kc triplets to the visited system. The visited system would again challenge the subscriber unit and compare the generated SRES from the subscriber unit. (Steps 440–475). Depending upon the received SRES, services is either allowed to commence or terminated. (Steps 475–485).

It should be appreciated that there are many variations upon the methods described in FIGS. 3 and 4, depending upon such factors as the programming of SIU 216 and subscriber unit 210, and the conversion and inter networking capabilities of the respective visited or home system switch centers and location registers. Thus, in the case of the embodiment illustrated in FIG. 4, an even more secure approach could be achieved by requiring the generation of a RAND and forwarding of a signed response to the home system before release of the SSD to the visited system. One skilled in the art will recognize that preferences for such variations may change based upon competing factors such as the desirability for maintaining more security over access to a temporary Ki key, and the liability incurred by the increased inter system signaling traffic and consequent delay forced upon the subscriber during authentication.

Figure 5:
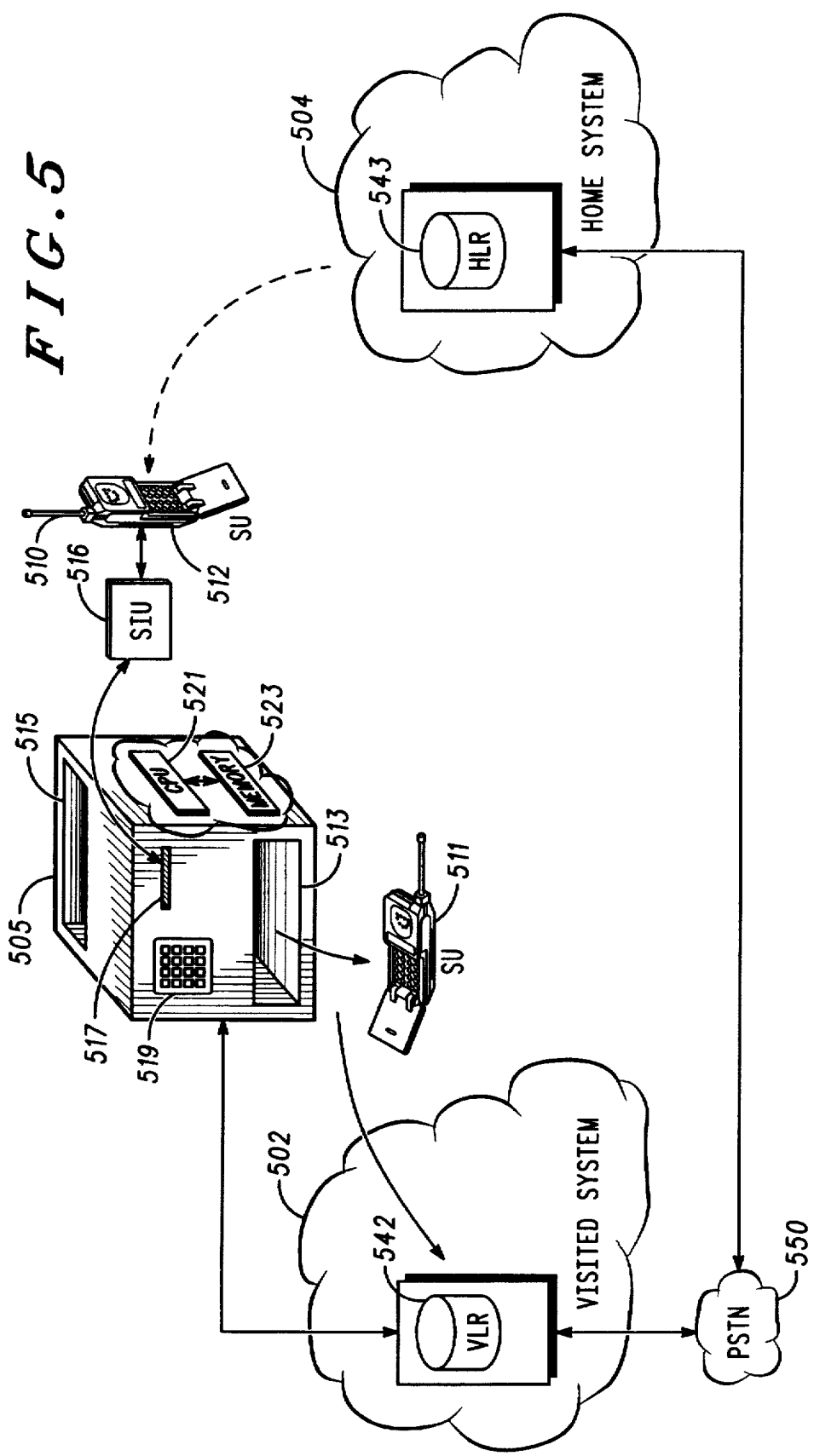
FIG. 5 is a diagram depicting another system providing for roaming in accordance with the invention.

FIG. 5 illustrates yet another embodiment for achieving inter system authentication and a more universal personal mobility for subscribers. In this illustrated embodiment, either of the subscriber unit 510 or a detachable subscriber identity unit (SIU) 516 contain the necessary authentication information for the subscriber, although subscriber unit 510 is not equipped as a dual air interface phone. Where SIU 516 is detachable from a slot 512 in subscriber unit 510, the subscriber may readily roam using the SIU 516 and an appropriately configured temporary subscriber unit 511 obtained for use within a visited system 502.

One particularly advantageous apparatus for achieving this universal mobility would be the use of a temporary subscriber unit terminal 505 (in this example a dispenser box) located at some entry point into the visited system, such as an airport or border crossing. In order to obtain a temporary subscriber unit 511, the subscriber would only need insert his SIU 516 into terminal 505. To provide for more security, a user PIN could be optionally required and entered via data entry interface 519 on the terminal 505. Smart card reader 517 would then obtain subscriber identity information (MSI) and alert the terminal to connect with a visitor location register (VLR) 542 of the local system.

In response the local system would generate a RAND and forward this to terminal 505. Upon determination of the subscriber's home system authentication format, for example from information in the MSI, the local system 502 or terminal 505 would convert the generated RAND into a home system format ($RAND_H$) for input to SIU 516. SIU 516 in turn would generate a signed response (e.g. SRES, but hereinafter more generally "RESP") and encryption key (e.g. Kc) using its secret key (e.g. Ki), and output the Kc and RESP to the terminal 505. Terminal 505 then forwards the MSI, location information (if not already present in the VLR) $RAND_H$ and RESP to the local system switch center or VLR 542, for forwarding to the home system 504 home location register 543.

Figure 7:
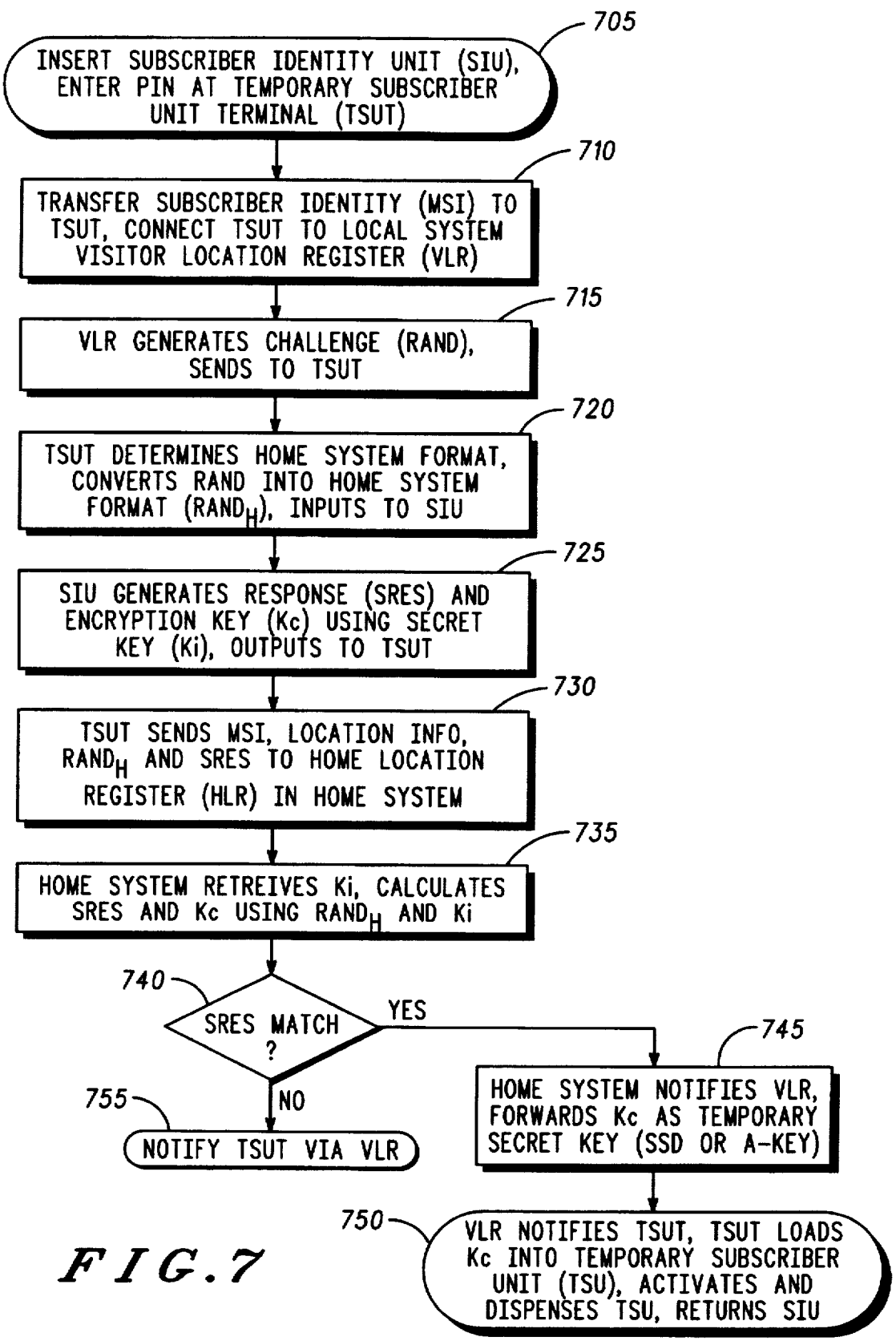
FIG. 7 is a flowchart of an authentication process in accordance with a third embodiment of the invention.

Upon retrieval of Ki, the home system would calculate RESP and Kc using the $RAND_H$ and Ki, and determine whether an authentication match existed. The result would be forwarded to the terminal 505 via PSTN 550 and VLR 542, along with a Kc for use as a temporary secret key (A-key). Upon receipt, terminal 505 would load the temporary A-key into temporary subscriber unit 511 (in its temporary, or volatile, memory) and activate and dispense temporary subscriber unit 511 to the subscriber, and return the SIU 516. (Steps 705–750 of FIG. 7). When done, the subscriber would return temporary subscriber unit 511 via return slot 513 in terminal 505 or a similar terminal.

If the subscriber were roaming with a subscriber unit that did not have a detachable SIU 516, such as is more typical of current USDC-style phones, this same inter system roaming could be achieved by appropriate modification to subscriber unit 510. Since subscriber unit 510 would have the necessary secret key information and algorithms for initial authentication, subscriber unit 510 need only be modified to include a data interface 512 such as metal contacts coupled to the MPU. Thus, instead of inserting SIU 516 into an appropriate reader 517, the subscriber unit could be placed into an appropriately configured receiving slot 515 on the terminal 505 and authentication information communicated between terminal 505 and subscriber unit 510 via contacts 512. The receiving slot could also be a rf chamber capable of receiving and communicating with subscriber unit 510 via an antenna and the subscriber unit's home air interface (using appropriately programmed and configured processor and transceiver(s) for all air interfaces to be serviced). Although such approaches are less convenient than one in which each subscriber has an SIU, they nonetheless provide for much greater mobility for the many subscribers having identifier/authentication information retained in a memory within their subscriber units.

While the above embodiment has been described with a view towards one subscriber unit roaming between systems using different authentication protocols, it is also possible to use an implementation like terminal 505 to provide for mobility of subscribers having a subscriber unit 510 compatible with only one air interface and one authentication protocol. Initial authentication could proceed, once contact via interface 512 on subscriber unit 510 is established at terminal 505, via established similar system protocols. In order to allow for greater mobility of the temporary subscriber unit, however, once authentication is initially established the temporary subscriber unit could be programmed via terminal 505 with a temporary A-key, which would act as the user's secret key for the duration of the rental. This temporary A-key could be programmed into the temporary subscriber unit 511 via contacts such as battery contacts, similar to security code programming presently being used. This of course requires an encrypted link between the terminal 505 and home system, due to the sensitivity of even a temporary A-key (alternatively, the temporary A-key could be a Kc from the SIU). A SSD would then be generated utilizing the new temporary A-key, and the rental unit 511 released for use. Assignment of a time variable or other parameter into the temporary subscriber unit 511 would establish a limit for the length of any usage on the temporary subscriber unit 511, thus providing an extra security precaution. The temporary subscriber unit 511 could be further configured so as to provide a warning to the subscriber as the end of the rental period approached.

Alternatively, some operators may find it preferable to have the temporary subscriber unit 511 preprogrammed with a MIN and A-key specific to that temporary subscriber unit 511. In this case, following successful authentication of a roaming subscriber, the terminal would provide the MIN to the home system via the visited system VLR. One of the location registers within the visited system would act as the home location register for the temporary subscriber unit 511, and would have appropriately stored information including the network copy of the A-key. Further authentication and encryption for the temporary subscriber unit 511 would proceed using the A-key and visited system protocols.

In yet another alternative approach, where the temporary subscriber unit 511 is equipped for reading a smart card (or SIM) terminal 505 can be preloaded with cards having known Ki/IMSI combinations. Then, as soon as the subscriber is authenticated, a smart card can be dispensed and its IMSI reported to the local (GSM) system. Further privacy and authentication can proceed according to the local authentication protocol.

Figure 6:
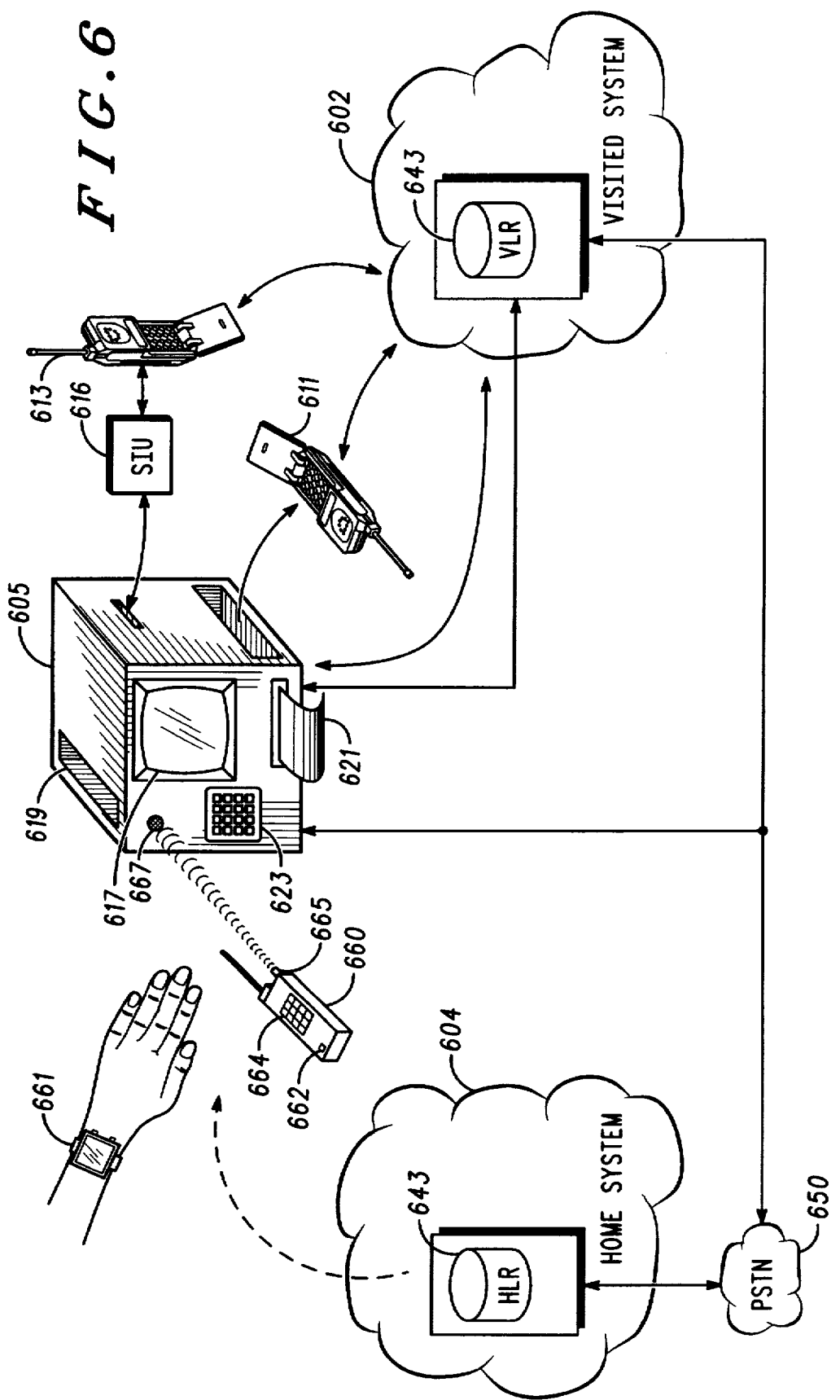
FIG. 6 is a diagram depicting yet another system allowing for roaming in accordance with the invention.

Turning to FIG. 6, yet another embodiment of the invention is illustrated. One method by which authentication can proceed with this embodiment is further illustrated in FIGS. 8 and 9. Unlike the previous embodiments which were focused on terminal mobility, i.e. allowing roaming of a subscriber unit or a temporary subscriber unit across system boundaries, the embodiment of FIG. 6 illustrates a further extension into "user" mobility or roaming across system boundaries and with multiple subscriber units. Rather than relying upon subscriber identity modules (SIMS) or smart cards to access service to one subscriber unit at a time, the apparatus and method of the present invention allow a subscriber (or user) identity unit to authenticate multiple services at a time as desired or needed by the subscriber. Nor does the SIU need to be detachable (and so more susceptible to being misplaced), but may be embedded in any convenient subscriber unit. Two such units are illustrated in FIG. 6, a small "candy bar"-sized phone 660, or even smaller yet watch-sized unit 661. Further advances in miniaturization will permit even smaller and more conveniently sized objects (for example pens and the like) to serve as a primary subscriber unit storing the user's subscriber identity unit.

In this further embodiment the subscriber unit includes a means for establishing a proximity link to a temporary subscriber unit terminal. By "proximity" is meant a limited range (typically less than 10 meters), and thus reasonably private or secure, communication link. This is depicted in FIG. 6 as a short range light-frequency (infrared) link between infrared transceivers 665 and 667 on subscriber unit 660 and terminal 605, respectively. The user can initiate this link manually, such as by depressing button 662, or by any other convenient user interface 664 such as a keypad or microphone (for voice recognition-capable subscriber units). One skilled in the art will further appreciate that the proximity link can be established via any wireless technology (e.g., low power rf, or even laser), and could be further established (for example for more secure transactions or as a backup) by means of electrical connectors suitably adapted on subscriber unit 660 and terminal 605.

Once the proximity link is established, the subscriber unit transfers a subscriber identity (for example either an IMSI or a TMSI, depending upon system preferences and capabilities) and a service request to the terminal 605. Additional parameters can be entered and transmitted via the subscriber unit 660, such as the period for which service is desired. Alternatively, these additional parameters could be entered directly through a user interface 623 on the terminal 605.

Upon receipt of the service request, a secure connection is established from terminal 605 to the local system's serving location register (VLR 643), and the local system is notified of the MSI, service request, and any additional parameters. In response, the local system 602 generates sufficient challenges (RANDs) for the amount of requested service and forwards the RANDs to the subscriber unit 660 via terminal 605. Terminal 605 is further equipped to recognize the home system and thus the authentication protocol and formatting used by the subscriber identity unit of subscriber 660, and converts the received RANDs into an appropriate home system format ($RAND_H$s). Alternatively, the SIU itself is equipped to recognize and convert challenges and responses received from visited systems 602 into its own home system format. In either case, an appropriately formatted RAND is received by the user identity unit and inputted into an authentication algorithm together with its secret key (e.g., Ki) to generate a response (e.g., $RESP_H$) and encryption key (e.g., Kc) for each $RAND_H$. The resulting triplets are appropriately converted and forwarded to (or alternatively forwarded and subsequently converted into local system protocol ($RESP_V$s) at) terminal 605.

Once the $RESP_V$s are received at VLR 643, the MSI, location, service request and RAND/$RESP_V$ pairs are forwarded to the home system 604 and home location register 643 or other authenticating center for the user identity unit. Upon appropriate conversion of the RAND/RESP pairs into its home system protocol, further $RESP_H$s and the encryption key(s) (Kc) are generated from the $RAND_H$ and stored secret key (Ki), The converted RESPs and further $RESP_H$s are then compared for an authentication match.

Terminal 605 is then notified of the result, and the calculated Kcs are forwarded upon authentication to the terminal 605 via VLR 643. VLR 643 stores the $RAND_V$-$RESP_V$-Kc triplets, and terminal 605 loads the stored triplets into the temporary subscriber unit 611,613. (See steps 805–885 of FIG. 8).

In addition to providing a temporary subscriber unit 611, 613, or a temporary smart card 616 for use in a temporary subscriber unit 613, terminal 605 itself could be used as a fixed end system or wireless fixed system for user services. For example, terminal 605 could include a video terminal 617 and user input 623 (keyboard, microphone or the like) or even a hard copy output such as a fax machine 621. Where the terminal is connected via wireless means to the local system 602, authentication and initiation of these services would precede as described above in connection with FIG. 8. It is also possible, where the terminal is connected directly to a voice (such as PSTN 650) or data network, to connect terminal 605 directly with home system 604 to receive authentication and obtain the desired communications. In this latter case, a simplified authentication procedure can be used in which the HLR 643 generates the necessary RANDs for the requested services and verifies the subsequent signed responses, all while using a more or less direct connection via the PSTN 650 to terminal 605. Alternatively, terminal 605 can generate the necessary RANDs ahead of time, obtain responses (RESPs), and forward a RAND-RESP pair as service is desired. For example, were an executive to notify a terminal 605 in a meeting room that all faxes should be sent to terminal 605 for a set time, terminal 605 would generate sufficient RANDs (e.g., based on a time parameter communicated by the subscriber executive) to last the set time. The subscriber unit 660 would generate the RESPs, and terminal 605 would communicate the subscriber unit 660 MSI, request for service, and a RAND/RESP pair, via PSTN 650 or VLR 643 if using wireless means, for authentication by the home system 604. Upon authentication, the home system 604 would store an indicator that faxes for the set time period should be forwarded to terminal 605. When a fax is ready to be forwarded, an additional RAND/RESP pair can be used to authenticate terminal 605 prior to actual transmission.

Because the user identity unit may be used to optionally activate several temporary subscriber units or services at a time, it is advantageous for subscriber unit 660 to come equipped with a user interface 664 which includes a display for alerting the user about the number and types of devices that are currently active as subscriber "proxies" or temporary subscriber units. It is also particularly advantageous to include in each of the subscriber units a protocol for turning off or "timing out" the unit at the end of the user's specified service period. A temporary subscriber unit so equipped would prompt the user toward the end of the service period about the need to reestablish a proximity link and obtain authorization for further service/additional triplets. Upon the end of such period without appropriate further authentication, the temporary subscriber unit would be equipped to delete any temporary identifier (TMSI) and triplets loaded into the temporary subscriber unit, and the user would be prompted to return the temporary subscriber unit to a terminal for further service. The temporary subscriber unit would also be equipped to delete any user specific information before the end of the service period specified in response to a user deactivation. (See steps 905–925 of FIG. 9).

Because the user has not relinquished his security credentials resident on the user identity unit, special services may be originated/delivered to any one of a number of target subscriber units appropriately authenticated by the user, and the user's own phone 660 may still simultaneously be used for originating and receiving ordinary voice calls if compatible with the local system air interface and network. The user interface 664 reminder feature serves to alert the user as to how many devices (and types) are currently under proxy rendering temporary services (for example, a "service" icon could show that a video conferencing terminal, a fax machine, and the subscriber unit 660 itself were active for services). This may beneficially prompt the user to terminate services no longer being used. Further, if a predetermined amount of service is requested (such as the setting of a time period or billing amount) an additional safeguard is provided in limiting the amount of service which can be misdirected if, for example, the user were to leave an activated fax machine unattended.

The invention has been described with reference to several illustrative embodiments. As the above description will make apparent to one skilled in the art, however, there are various modifications and further embodiments that can be made without departing from the spirit and scope of the invention. Thus, for example, under appropriately configured systems the particular authentication methods described in connection with FIGS. 3 and 4 can also be used in connection with the embodiment of FIG. 6, both for service provided to subscriber unit 660 (if appropriately configured for the local air interface) and for the terminal 605. A skilled artisan will appreciate that modifications may be employed in the specific interworking of authentication functions depending upon the particular protocols and interfaces being used in systems between which user roaming is to be implemented. Further, while the illustrative embodiments were described in connection with cellular or PCS services, it should be understood that the invention has application to all communication systems requiring authentication, including satellite based, paging and other wireless data, cable and other fixed end terminals communicating via wire or fiber optic channels. Finally, while the above description illustrated the invention by discussion of authentication for one subscriber, it should be understood that the invention has application to, and indeed expects, plural systems to be concurrently processing numerous subscriber authentication requests. Thus, this invention is not to be limited to the specific embodiments discussed and illustrated herein, but rather by the following claims.

We claim:

1. A method of generating authentication information for use in authenticating a subscriber unit communicating via a communication unit of a visited communication system using a first authentication protocol, the subscriber unit and a home communication system of the subscriber unit each storing a subscriber unit identifier and a first secret key of the subscriber unit and an authentication algorithm, the method comprising: in the home communication system, wherein the home communication system uses a home authentication protocol different from the first authentication protocol, (a) receiving the identifier and an indication of a request for service from the communication unit;

(b) in response to the request for service, generating an authentication challenge ($RAND_H$) in the home authentication protocol and obtaining the first secret key;

(c) processing the $RAND_H$ into an authentication response ($RESP_H$) in the home authentication protocol using the home communication system stored first secret key and authentication algorithm;

(d) converting the $RAND_H$ into an authentication challenge ($RAND_V$) in the first authentication protocol and converting the $RESP_H$ into a response ($RESP_V$) in the first authentication protocol; and (e) communicating the $RAND_V$ and $RESP_V$ to the communication unit for use in authenticating the subscriber unit.

2. The method of claim 1 further comprising: in the subscriber unit, (a) receiving the $RAND_V$ from the communication unit;

(b) converting, in response to a determination that the first authentication protocol is different from a home authentication protocol used in the home communication system, the $RAND_V$ into a further authentication challenge ($RAND_{H2}$) in the home authentication protocol;

(c) obtaining the subscriber unit stored first secret key and processing the $RAND_{H2}$ into a further authentication response ($RESP_{H2}$) in the home authentication protocol using the first secret key and authentication algorithm;

(d) converting the $RESP_{H2}$ into a further response ($RESP_{V2}$) in the first authentication protocol; and (e) sending the $RESP_{V2}$ to the communication unit.

3. The method of claim 2 further comprising authenticating the subscriber unit by the communication unit by determining whether the $RESP_V$ and the $RESP_{V2}$ were generated by a same secret key.

4. The method of claim 3 further comprising authenticating the subscriber unit by the communication unit by determining whether the $RESP_V$ and the $RESP_{V2}$ match.

5. A method of generating authentication information for use in authenticating a subscriber unit communicating via a communication unit of a visited communication system using a first authentication protocol, the subscriber unit and a home communication system of the subscriber unit each storing a subscriber unit identifier and a first secret key of the subscriber unit and an authentication algorithm, the method comprising: in the home communication system, wherein the home communication system uses a home authentication protocol different from the first authentication protocol, (a) receiving an authentication message including the identifier of the subscriber unit, and an authentication challenge ($RAND_V$) and response ($RESP_V$) to the $RAND_V$ in the first authentication protocol from the communication unit;

(b) in response to authentication message, converting the $RAND_V$ into an authentication challenge ($RAND_H$) in the home authentication protocol;

(c) obtaining the first secret key and processing the $RAND_H$ into an authentication response ($RESP_H$) in the home authentication protocol using the first secret key and authentication algorithm;

(d) determining whether the $RESP_H$ and $RESP_V$ are both derived from the first secret key; and (e) sending a message confirming authentication when it is determined the $RESP_H$ and $RESP_V$ are both derived from the first secret key.

6. The method of claim 5 wherein step (d) further comprises converting the $RESP_H$ into a $RESP_{V2}$ in the first authentication protocol and determining whether the $RESP_H$ and $RESP_{V2}$ match.

7. A method of generating an authentication message for a subscriber unit communicating via a communication unit of a visited communication system using a first authentication protocol, the subscriber unit having a subscriber identity unit, and the subscriber identity unit and a home communication system of the subscriber identity unit each storing a subscriber identity unit identifier and a first secret key of the subscriber identity unit and an authentication algorithm, the method comprising: in the subscriber unit, (a) receiving a first authentication challenge ($RAND_V$) in the first authentication protocol from the communication unit;

(b) converting, in response to a determination that the first authentication protocol is different from a home authentication protocol used in the home communication system, the $RAND_V$ into an authentication challenge ($RAND_H$) in the home authentication protocol;

(c) obtaining the subscriber identity unit stored first secret key and processing the $RAND_H$ into an authentication response ($RESP_H$) in the home authentication protocol using the subscriber identity unit stored first secret key and authentication algorithm;

(d) converting the $RESP_H$ into a response ($RESP_V$) in the first authentication protocol; and (e) sending the $RESP_V$ to the communication unit.

8. The method of claim 7 wherein step (d) comprises inserting pseudo random filler bits in the $RESP_H$ to result in the $RESP_V$ having a same bit length compatible with authentication responses in the first authentication protocol.

9. A method of authenticating a subscriber unit via a temporary subscriber unit terminal in a visited communication system using a first authentication protocol, the subscriber unit and a home communication system of the subscriber unit each storing a subscriber unit identifier and a first secret key of the subscriber unit and an authentication algorithm, the method comprising: in the terminal, (a) establishing a proximity communication link with the subscriber unit;

(b) establishing a communication channel with a communication unit of the visited communication system, and requesting and receiving from the communication unit a first authentication challenge ($RAND_V$) in the first authentication protocol from the visited communication system;

(c) converting, in response to a determination that the first authentication protocol is different from a home authentication protocol used in the home communication system of the subscriber unit, the $RAND_V$ into an authentication challenge ($RAND_H$) in the home authentication protocol, and sending the $RAND_H$ to the subscriber unit;

(d) receiving an authentication response ($RESP_H$) from the subscriber unit, and converting the $RESP_H$ into a response ($RESP_V$) in the first authentication protocol;

(e) sending the $RESP_V$ to the communication unit; and (f) receiving an authentication message notifying the terminal to activate a temporary subscriber unit when the $RESP_V$, converted into the home authentication protocol, is determined to match a further response calculated from the $RAND_V$, converted into the home authentication protocol, and the first secret key using the authentication algorithm.

10. The method of claim 9 wherein the subscriber unit comprises a subscriber identity unit and the terminal includes an subscriber identity unit interface device, and step (a) comprises receiving the subscriber identity unit and establishing an electromagnetic communication channel with the subscriber identity unit.

11. The method of claim 9 wherein the subscriber unit includes electrical contacts and the terminal includes an subscriber unit interface device having complementary electrical contacts, and step (a) comprises interfacing the subscriber unit in the subscriber unit interface device to establish a communication channel with the subscriber unit via the electrical and complementary electrical contacts.

12. The method of claim 9 wherein the subscriber unit and terminal each have a light-frequency transceiver, and step (a) comprises establishing a light-frequency communication channel between the light-frequency transceivers of the subscriber unit and terminal.

13. A subscriber unit adapted for interfacing with a subscriber identity unit and for communicating via a communication unit of a local communication system and being authenticated by a home communication system, wherein the subscriber identity unit includes a memory having a subscriber identifier, a first secret key and an authentication algorithm, the subscriber unit comprising:

(a) communications means for sending and receiving signals to and from the communication unit;

(b) determining means for determining that the local communication system uses a local system authentication protocol different from a home system authentication protocol used in the subscriber identity unit, and for activating a converting means in response to such a determination;

(c) the converting means, coupled to the determining means and communications means, being operable for converting a first authentication challenge ($RAND_V$) from the communication unit in the local system authentication protocol into a home authentication challenge ($RAND_H$) in the home authentication protocol; and (d) interface means, coupled to the converting means and the subscriber identity unit when the subscriber identity unit is interfaced with the subscriber unit, for inputting the $RAND_H$ into the subscriber identity unit for processing by the subscriber identity unit into a response ($RESP_H$) and first encryption key using the first secret key and home system authentication algorithm, and for receiving the $RESP_H$ and first encryption key from the subscriber identity unit;

wherein the converting means is further operable for converting the $RESP_H$ into a first response ($RESP_V$) in the local system authentication protocol and outputting the $RESP_V$ to the communication means for transmission to the communication unit.

14. The subscriber unit of claim 13 wherein the converting means comprises:

means for storing further $RAND_V$s received via the communication means until n further $RAND_V$s are stored, where n is a predetermined whole number, and then converting the n further $RAND_V$s into a further $RAND_H$ for input into the subscriber identity unit.

15. The subscriber unit of claim 13 wherein the converting means comprises:

means for storing further $RAND_V$s received via the communication means in a register, and converting the $RAND_V$ and further $RAND_V$s by (i) when the stored $RAND_V$ and further $RAND_V$s have a total number of bits less than a number of bits of a standard authentication challenge of the home authentication protocol, inserting filler bits to form the $RAND_H$; and (ii) when the stored $RAND_V$ and further $RAND_V$s have a total number of bits greater than a number of bits of a standard authentication challenge of the home authentication protocol, using first bits, of the stored $RAND_V$ and further $RAND_V$s most recently stored and having a same number as the number of bits of said standard authentication challenge of the home authentication protocol, to form the $RAND_H$.

16. The subscriber unit of claim 13 wherein the determining means is a switch circuit responsive to a user input activating the subscriber unit for communication within the local communication system.

17. The subscriber unit of claim 13 wherein the determining means and converting means together comprise a processor adapted for comparing a predetermined parameter of the received $RAND_V$ against stored predetermined parameters, each corresponding to a system authentication protocol, to determine whether the local system authentication protocol differs from the home system authentication protocol, and when the local system authentication protocol differs converting the $RAND_V$ to the $RAND_H$.

18. The subscriber unit of claim 17 wherein the predetermined parameter is the bit length of the $RAND_V$, and the processor is further adapted for, when the local system authentication protocol differs from the home system authentication protocol, converting the $RAND_V$ by either truncating or adding additional bits such that the $RAND_H$ has a same bit length as the stored predetermined parameter bit length corresponding to the home system authentication protocol.

19. A subscriber unit for communicating via a communication unit of a local communication system and being authenticated by a home communication system, wherein the subscriber unit includes a memory having a subscriber identifier, a first secret key and an authentication algorithm, the subscriber unit comprising:

(a) communications means for sending and receiving signals to and from the communication unit;

(b) determining means for determining that the local communication system uses a local system authentication protocol different from a home system authentication protocol used in the subscriber unit, and for activating an authentication means in response to such a determination; and (c) the authentication means, coupled to the determining means and communications means, being operable for (i) converting a first authentication challenge ($RAND_V$) from the communication unit in the local system authentication protocol into a home authentication challenge ($RAND_H$) in the home authentication protocol, (ii) processing the $RAND_H$ into a response ($RESP_H$) and first encryption key using the first secret key and authentication algorithm, and for converting the $RESP_H$ into a first response ($RESP_V$) in the local system authentication protocol and outputting the $RESP_V$ to the communication means for transmission to the communication unit.

20. The subscriber unit of claim 19 wherein the determining means is a switch circuit responsive to a user input activating the subscriber unit for communication within the local communication system.

21. The subscriber unit of claim 19 wherein the first secret key is a temporary secret key generated from a second secret key also stored in the memory, and the subscriber unit further comprises an encryption means for encrypting and decrypting information communicated via the communication unit using the temporary secret key.

22. The subscriber unit of claim 19 wherein the determining means and authentication means together comprise a processor adapted for comparing a predetermined parameter of the received $RAND_V$ against stored predetermined parameters, each corresponding to a system authentication protocol, to determine whether the local system authentication protocol differs from the home system authentication protocol, and when the local system authentication protocol differs converting the $RAND_V$ to the $RAND_H$.

23. The subscriber unit of claim 22 wherein the predetermined parameter is the bit length of the $RAND_V$, and the processor is further adapted for, when the local system authentication protocol differs from the home system authentication protocol, converting the $RAND_V$ by either truncating or adding additional bits such that the $RAND_H$ has a same bit length as the stored predetermined parameter bit length corresponding to the home system authentication protocol.

24. The subscriber unit of claim 19 further comprising second communication means, coupled to the determining means and authentication means, for establishing a proximity communication channel with a temporary subscriber unit terminal and communicating at least one further challenge, at least one further authentication response generated for each further challenge, the subscriber identifier and a service request between the subscriber unit and the terminal.

25. The subscriber unit of claim 24, wherein the determining means is further operable for determining whether the at least one further challenge is in the home system authentication protocol, and wherein the authentication means is further operable for (i) generating at least one further authentication response for each further challenge using the first secret key and outputting each at least one further authentication response for communication to the terminal, when the at least one further challenge is in the home system protocol; and (ii) converting the at least one further challenge into the home authentication protocol, processing each converted at least one further challenge into a further authentication response and further encryption key using the first secret key and authentication algorithm, and converting each said response to each converted at least one further challenge into the local system authentication protocol and outputting the each converted response to the second communication means for communication to the terminal.

26. The subscriber unit of claim 24 wherein the second communications means comprises a light frequency transceiver adapted for communicating with a light frequency transceiver on the terminal.

27. The subscriber unit of claim 26 wherein the light frequency transceivers are infrared transceivers.

28. A subscriber identity unit adapted for being received in a subscriber unit communicating via a communication unit of a local communication system, wherein the subscriber identity unit includes a memory having a subscriber identifier, a first secret key and at least one authentication algorithm, the subscriber identity unit comprising:

(a) interface means for sending and receiving information to and from the subscriber unit;

(b) determining means for determining whether a challenge (RAND) received from the subscriber unit is in a home system authentication protocol or a visited system authentication protocol different from the home system authentication protocol, and for activating a converting means in response to such a determination that the RAND is in a visited system authentication protocol;

(c) the converting means, coupled to the determining means and interface means, being operable for converting a first authentication challenge ($RAND_V$) from the communication unit in the visited system authentication protocol into a home authentication challenge ($RAND_H$) in the home system authentication protocol; and (d) processing means, coupled to the converting means, for inputting the $RAND_H$ and calculating a response ($RESP_H$) using the $RAND_H$, the first secret key and the authentication algorithm;

wherein the converting means is further operable for receiving and converting the $RESP_H$ into a first response ($RESP_V$) in the visited system authentication protocol and outputting the $RESP_V$ to the SU.

29. The subscriber identity unit of claim 28 wherein the converting means comprises:

means for storing further $RAND_V$s received via the communication means until n further $RAND_V$s are stored, where n is a predetermined whole number, and then converting the n further $RAND_V$s into a further $RAND_H$ for input to the processing means.

30. The subscriber identity unit of claim 28 wherein the processing means is further operable for calculating a first privacy key ($K_H$) using the $RAND_H$, the first secret key and the authentication algorithm, and wherein the converting means is further operable for receiving and converting the first $K_H$ into a first privacy key in the visited system authentication protocol ($K_V$) and outputting the $K_V$ to the subscriber unit.

31. The subscriber identity unit of claim 28 wherein the determining means is a switch circuit responsive to a user input activating the subscriber unit for communication within the local communication system.

32. The subscriber unit of claim 28 wherein the determining means, converting means and processing means together comprise a processor adapted for comparing a predetermined parameter of the received RAND against stored predetermined parameters, each corresponding to a system authentication protocol, to determine whether a local system authentication protocol is the visited system authentication protocol, and if so converting the $RAND_V$ to the $RAND_H$, calculating the $RESP_H$, and converting the $RESP_H$ into the $RESP_V$.

33. The subscriber unit of claim 32 wherein the predetermined parameter is the bit length of the RAND, and the processor is further adapted for, when the local system authentication protocol is the visited system authentication protocol, converting the $RAND_V$ by either truncating or adding additional bits such that the $RAND_H$ has a same bit length as the stored predetermined parameter bit length corresponding to the home system authentication protocol.

34. The subscriber identity unit of claim 32 further comprising communication means, coupled to the processor, for establishing a proximity communication channel with a temporary subscriber unit terminal and communicating at least one further challenge, at least one further authentication response generated for each further challenge, the subscriber identifier and a service request between the subscriber identity unit and the terminal.

35. The subscriber unit of claim 34, wherein the determining means is further operable for determining whether the at least one further challenge is in the home system authentication protocol, and wherein the processor is further operable for (i) generating at least one further authentication response for each further challenge using the first secret key and outputting each at least one further authentication response for communication to the terminal, when the at least one further challenge is in the home system protocol; and (ii) converting the at least one further challenge into the home authentication protocol, processing each converted at least one further challenge into a further authentication response and further encryption key using the first secret key and authentication algorithm, and converting each said response to each converted at least one further challenge into the visited system authentication protocol and outputting the each converted response to the communication means for communication to the terminal.

36. A subscriber terminal, for providing communication services to a subscriber having an authentication unit including a communications interface, a processor and a memory storing a subscriber identifier, a secret key and an authentication algorithm, and for communicating information between the authentication unit and a communication unit of a local communication system and authenticating the authentication unit by a home communication system of the authentication unit, the terminal comprising:

(a) communications means for sending and receiving information to and from the communication unit, and for sending and receiving information to and from the authentication unit via the communications interface;

(b) determining means for determining that the authentication unit uses a home system authentication protocol different from a local system authentication protocol used in the communication unit, and for activating a converting means in response to such a determination;

(c) the converting means, coupled to the determining means and communications means, being operable for converting a first authentication challenge ($RAND_V$) in the local system authentication protocol into a home authentication challenge ($RAND_H$) in the home authentication protocol, and for converting a first response ($RESP_H$) to the $RAND_H$ from the authentication unit in the home system authentication protocol into a response ($RESP_V$) in the local system authentication protocol;

wherein the communications means is further operable for communicating the $RAND_H$ to the authentication unit and receive the $RESP_H$ from the authentication unit, and for communicating the $RESP_V$ to the communication unit.

37. The subscriber terminal of claim 36 further comprising:

(d) storage means for storing a temporary subscriber unit; and (e) release means, coupled to the storage means and communication means, for determining the authentication unit is authenticated by the home communication system and in response thereto releasing the temporary subscriber unit.

38. The subscriber terminal of claim 37 wherein the release means further comprises temporary subscriber unit interface means for inputting at least one further $RAND_V/RESP_V$ pair into the temporary subscriber unit for use in authenticating the temporary subscriber unit in the local communication system.

39. The subscriber terminal of claim 37 wherein the release means further comprises temporary subscriber unit interface means for inputting at least one further privacy key ($K_V$) into the temporary subscriber unit for use in encrypting information to and from the temporary subscriber unit when communicating via the local communication system.

40. The subscriber terminal of claim 37 wherein the release means further comprises temporary subscriber unit interface means for inputting at least one user parameter into the temporary subscriber unit for limiting the operation of the temporary subscriber unit, and wherein the at least one use parameter includes information specifying the period of time after which the temporary subscriber unit is deactivated and any subscriber-specific information stored therein erased.

41. The subscriber terminal of claim 36 further comprising:

(d) storage means for storing a temporary subscriber identity unit; and (e) release means, coupled to the storage means and communication means, for determining the authentication unit is authenticated by the home communication system and in response thereto releasing the temporary subscriber identity unit.

42. The subscriber terminal of claim 36 wherein the authentication unit is a subscriber identity unit smart card, and the communications means includes a smart card reader for sending and receiving information to and from the authentication unit via the communications interface.

43. The subscriber terminal of claim 36 wherein the authentication unit is a subscriber unit and the communications interface includes electrical contacts, and the communication means further comprises contact means adapted for receiving the subscriber unit electrical contacts and sending and receiving the information to and from the subscriber unit via the electrical contacts.

44. The subscriber terminal of claim 36 wherein the authentication unit is a subscriber unit and the communications interface includes an enclosed rf transmission chamber having an antenna, and the communication means further comprises means adapted for transceiving to and from the subscriber unit using a home communication system air interface.

45. The subscriber terminal of claim 36 wherein the communications means further comprises a means for establishing a proximity-only communication channel with the communications interface of the authentication unit.

46. The subscriber terminal of claim 45 wherein the communications interface includes a light frequency transceiver, and the means for establishing a proximity-only communication channel includes a light frequency transceiver.

47. The subscriber terminal of claim 45 further comprising:

(d) storage means for storing a temporary subscriber unit; and (e) release means, coupled to the storage means and communication means, for determining the authentication unit is authenticated by the home communication system and in response thereto releasing the temporary subscriber unit.

48. The subscriber terminal of claim 45 further comprising a user interface coupled to the communication means, wherein the communication means is further operable for determining the authentication unit is authenticated by the home communication system and in response thereto connecting a communication channel to the user interface.

49. The subscriber terminal of claim 48 wherein the user interface is one of the group consisting of a video terminal, an audio input/output device, a facsimile device and a data modem.

50. The subscriber terminal of claim 36 wherein the local communication system is the home communication system of the authentication unit and the authentication unit is authenticated at a second communication unit in the home communication system, and the communications means further comprises a means for establishing a proximity-only communication channel with the communications interface of the authentication unit.

51. A temporary subscriber unit for communicating user information via a local communication system, comprising:

(a) a temporary memory;

(b) interface means, coupled to the temporary memory, for receiving and inputting authentication information and at least one use parameter into the temporary memory, wherein the at least one use parameter includes information specifying an amount of communications services allowed after which further communications with the temporary subscriber unit are inhibited;

(c) communications means, coupled to the temporary memory, for using the authentication information to authenticate the temporary subscriber unit, and communicating the user information, with a local system for the specified amount of communications services; and (d) deactivation means for to inhibit the communication means and erase the authentication information and any subscriber-specific information following the specified amount of communications services.

52. The temporary subscriber unit of claim 51 wherein the communications means further comprises a means for establishing a proximity-only communication channel with a subscriber authentication unit.

53. A communication unit of a home communication system of a subscriber unit capable of operation in a second local communication system, wherein the communication unit and subscriber unit each have a memory including an authentication algorithm, a stored first secret key and a subscriber identifier of the subscriber unit, the communication unit comprising:

(a) communication means for receiving and sending authentication information for the subscriber unit, wherein the authentication information includes at least a challenge (RAND) and a response to the challenge (RESP) by the subscriber unit;

(b) determining means for determining that the authentication information from the local communication system is in a local system authentication protocol different from a home system authentication protocol used in the subscriber unit; and (c) authentication means, coupled to the determining means and communications means, for (i) converting a first authentication challenge ($RAND_V$) from the local communication system in the local system authentication protocol into a home authentication challenge ($RAND_H$) in the home authentication protocol, (ii) processing the $RAND_H$ into a response ($RESP_H$) using the first secret key and authentication algorithm, and for converting the $RESP_H$ into a first response ($RESP_V$) in the local system authentication protocol and outputting the $RESP_V$ to the communication means for transmission to the local communication system.

54. The communication unit of claim 53 wherein the authentication means is further operable for processing the $RAND_H$ into a first encryption key using the first secret key and an encryption algorithm, and for converting the first encryption key into a converted encryption key in the local system authentication protocol and outputting the converted encryption key to the communication means for transmission to the local communication system.

55. The communication unit of claim 53 wherein the authentication means is further operable (i) for generating a further home authentication challenge ($RAND_H$) in the home authentication protocol, (ii) for processing the further $RAND_H$ into n responses using the first secret key and authentication algorithm, where n is a predetermined whole number greater than 1 and each of the n responses is in the local system authentication protocol, and processing the further $RAND_H$ into a shared encryption key using the first secret key and an encryption algorithm and for converting the shared encryption key into a converted shared encryption key in the local system authentication protocol, and (iii) for outputting the further $RAND_H$, n responses and converted shared encryption key to the communication means for transmission to the local communication system.

56. A communication unit of a home communication system of a subscriber unit capable of operation in a second local communication system, wherein the communication unit and subscriber unit each have a memory including an authentication algorithm, a stored first secret key and a subscriber identifier of the subscriber unit, the communication unit comprising:

(a) communication means for receiving a request for authentication of the subscriber unit from the local communication system;

(b) determining means, coupled to the communication means, for determining, following receipt of the request for authentication, that the local communication system uses a local system authentication protocol different from a home system authentication protocol used in the subscriber unit;

(c) authentication means, coupled to the determining means and communications means, for generating authentication information in the local system authentication protocol for outputting to the communications means, the authentication means comprising means for generating a challenge and a response and means for converting the challenge and response from the home system authentication protocol into a challenge and response in the local system authentication protocol.

57. The communication unit of claim 56 wherein the communications means is operable to send the $RAND_V$ and $RESP_V$ as the authentication information to the local communication system.

58. The communication unit of claim 57 wherein the generating means is further operable for generating an encryption key using the authentication algorithm and first secret key, and the conversion means are further operable for converting the encryption key from the home system authentication protocol into a converted encryption key in the local system authentication protocol; wherein the communications means is further operable to send the converted encryption key along with the authentication information to the local communication system.

59. A communication system including a first subscriber unit, a home system having at least one home communication unit using a first authentication protocol and having memory for storing an identifier and first secret key of the first subscriber unit, wherein the home communication unit is operable for processing an authentication challenge into a response using the authentication challenge and first secret key, the communication system comprising:

(a) a second local system having a local communication unit using a second authentication protocol, wherein the subscriber unit is operable for communicating with both the home system and local system;

(b) interworking means, coupled to at least one of the local communication unit and home communication unit, for converting a first authentication challenge ($RAND_V$) in the second authentication protocol into a home authentication challenge ($RAND_H$) in the home authentication protocol, and converting a response to the $RAND_H$ ($RESP_H$) in the home authentication protocol into a response ($RESP_V$) in the second authentication protocol; and (c) communication means for coupling the local communication unit to the home communication unit for communicating between the local communication unit and home communication unit one of the group consisting of the $RAND_V$ and the $RAND_H$ and one of the group consisting of the $RESP_H$ and the $RESP_V$.

60. The communication system of claim 59 wherein the local communication unit is adapted for sending the $RAND_V$ and $RESP_V$ to the home communication unit via the communication means; the interworking means is coupled to the home communication unit and operable for converting the $RAND_V$ into the $RAND_H$ and the $RESP_H$ into the $RESP_V$; the home communication unit includes an authentication means for receiving the $RAND_H$, processing the $RAND_H$ into a further response using the $RAND_H$ and first secret key, and determining if the further response matches the $RESP_H$.

61. The communication system of claim 59 wherein the home communication unit includes an authentication means for generating, in response to a request for authentication of the subscriber unit via the local communication unit, the $RAND_H$ and processing the $RAND_H$ into the $RESP_H$ using the $RAND_H$ and first secret key; the interworking means is coupled to the home communication unit and operable for converting the $RAND_V$ into the $RAND_H$ and the $RESP_H$ into the $RESP_V$; and the home communication unit is further adapted for sending the $RAND_V$ and $RESP_V$ to the local communication unit via the communication means.

* * * * *